US008032134B2

(12) United States Patent
Tung

(10) Patent No.: US 8,032,134 B2
(45) Date of Patent: Oct. 4, 2011

(54) BEAMFORMING WITH GLOBAL POSITIONING AND ORIENTATION SYSTEMS

(75) Inventor: Chien-Cheng Tung, Fremont, CA (US)

(73) Assignee: Ralink Technology Corporation, Jhubei (TW)

( * ) Notice: Subject to any disclaimer, the term of this patent is extended or adjusted under 35 U.S.C. 154(b) by 1041 days.

(21) Appl. No.: 11/739,657

(22) Filed: Apr. 24, 2007

(65) Prior Publication Data
US 2008/0268865 A1 Oct. 30, 2008

(51) Int. Cl.
*H04W 4/00* (2009.01)
(52) U.S. Cl. ...... 455/429; 455/427; 455/12.1; 455/13.2; 455/98; 455/404.2; 370/316
(58) Field of Classification Search .................. 455/429, 455/427, 12.1, 13.2, 98, 404.2; 370/316
See application file for complete search history.

(56) References Cited

U.S. PATENT DOCUMENTS

| | | | | |
|---|---|---|---|---|
| 6,512,481 | B1* | 1/2003 | Velazquez et al. | ............ 342/367 |
| 7,019,595 | B1 | 3/2006 | Lo et al. | |
| 7,197,094 | B2 | 3/2007 | Tung | |
| 7,245,677 | B1 | 7/2007 | Pare, Jr. | |
| 7,248,650 | B1 | 7/2007 | Tung et al. | |
| 7,266,146 | B2 | 9/2007 | Pare, Jr. et al. | |
| 2004/0147244 | A1* | 7/2004 | Raisanen | ................... 455/404.2 |
| 2005/0042999 | A1* | 2/2005 | Rappaport | .................... 455/307 |

OTHER PUBLICATIONS

B. Widrow, P.E. Mantey, L.J. Griffiths and B.B. Goode, Proceedings of the IEEE, Adaptive Antenna Systems, Journal Article, Dec. 1967, vol. 55, No. 12.
Richard P. Gooch and Brian J. Sublett, A Multimode Adaptive Beamformer for Quadrature-Amplitude-Modulated Signals, Article, Apr. 11-14, 1998, 9 pages, Applied Signal Technology, Inc., IEEE 1988 International Conference on Acoustics, Speech, and Signal Processing.
Richard P. Gooch and Brian J. Sublett, Joint Spatial and Temporal Equalization in a Decision-Directed Adaptive Antenna System, Article, Oct. 31-Nov. 2, 1988, 11 pages, Applied Signal Technology, Inc., Twenty-second Annual Asilomar Conference on Signals, Systems, and Concepts.

* cited by examiner

*Primary Examiner* — Nimesh Patel
(74) *Attorney, Agent, or Firm* — IPxLaw Group LLP; Maryam Imam

(57) ABSTRACT

A wireless communication system for transmitting signals having a wireless positioning system being responsive to incoming signals for processing the same to generate coordinate information for determining the position of said wireless communication system, in accordance with an embodiment of the present invention. The wireless communication system further includes a phase controller module being responsive to said coordinate information for controlling the phase of the output signals for transmission in a specified direction by performing beamforming, said wireless communication system for performing beamforming to increase the range of transmission of said output signals.

12 Claims, 3 Drawing Sheets

BEAMFORMING WITH GLOBAL POSITIONING AND ORIENTATION SYSTEMS

BACKGROUND OF THE INVENTION

1. Field of the Invention

The present invention relates generally to the field of remote wireless communication and particularly to a method and apparatus for beamforming with global positioning and orientation systems.

2. Description of the Prior Art

More recently and with the advent of wireless communication systems remote and wireless communication is gaining more popularity among common users. An example is a highway with several base stations. If a vehicle is within the range of a base station information regarding the location and neighborhood may be exchanged between the vehicle and the base stations.

Currently base stations employ beamforming to increase the range and bandwidth of communication systems. For example, in the conventional cellular phones, the base station performs beamforming to communicate with each of the clients resulting in a substantially large data base to track the numerous vehicles on the road. This is sufficient for cellular phone and other voice related communication systems since the bandwidth required is relatively narrow and the range is relatively long.

Alternatively, in a wireless local area network (LAN) the bandwidth is substantially wide but the range is relatively short. Since wireless LAN is often used indoor, such as in an office environment, the relatively short range is acceptable.

The conventional communication systems have reached theoretical limit. The more recent WIMAX communication systems have range and throughput in the middle. Thus, it is desirable to provide a means and apparatus for long range high throughput communication with dramatic broadband system improvements.

SUMMARY OF THE INVENTION

Briefly, an embodiment of the present invention includes a wireless communication system for transmitting signals having a wireless positioning system being responsive to incoming signals for processing the same to generate coordinate information for determining the position of said wireless communication system. The wireless communication system further includes a phase controller module being responsive to said coordinate information for controlling the phase of the output signals for transmission in a specified direction by performing beamforming, said wireless communication system for performing beamforming to increase the range of transmission of said output signals.

The foregoing and other objects, features and advantages of the present invention will be apparent from the following detailed description of the preferred embodiments which make reference to several figures of the drawing.

IN THE DRAWINGS

DETAILED DESCRIPTION OF THE PREFERRED EMBODIMENTS

Figure 1:
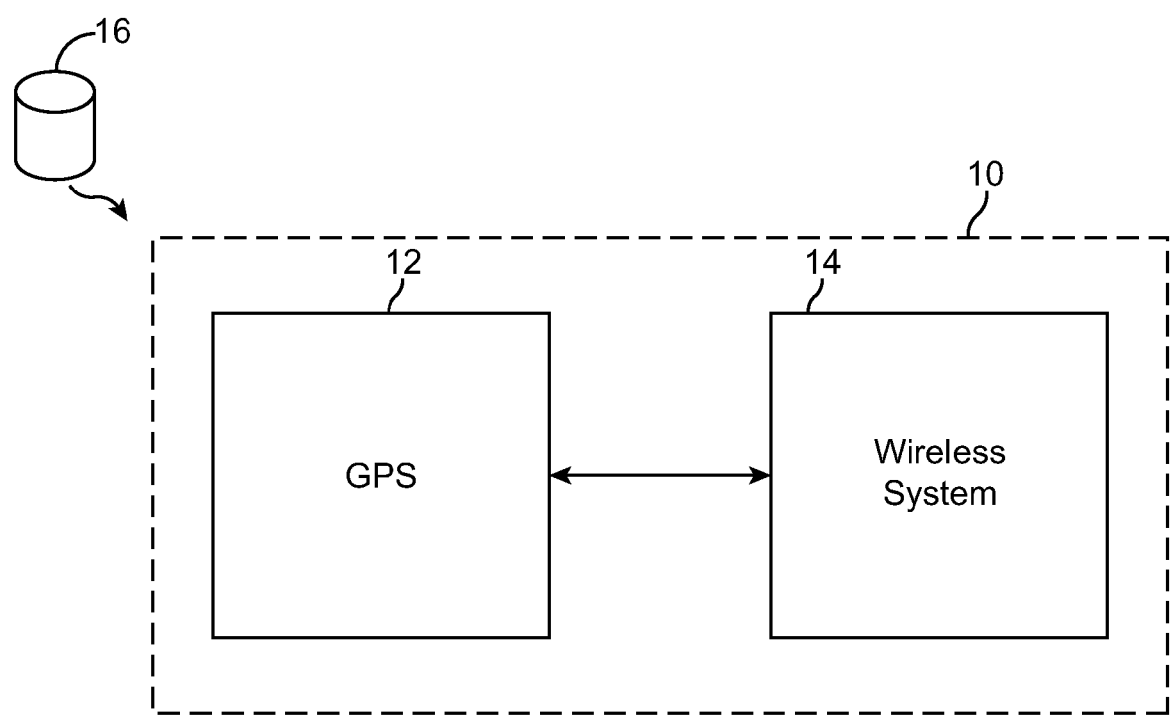
FIG. 1 shows a wireless communication system, in accordance with an embodiment of the present invention.

Referring now to FIG. 1, a wireless communication 10 is shown to include a wireless positioning system 12 and a wireless transmission system 14, in accordance with an embodiment of the present invention. The wireless positioning system 12 is coupled to the wireless transmission system 14.

The wireless communication system 10 transmits output signals to a receiver (not shown in FIG. 1) either by transmitting in all directions or by performing beamforming. Transmission of the output signals is mainly in the radio frequency (RF) range although transmission at other frequencies is also possible.

Beamforming is a signal processing technique used to control directionality of, or sensitivity to a radiation pattern. The wireless communication system 10 by performing beamforming can increase the gain in the direction in which the output signal is to be transmitted. The direction of transmission of the output signal is specified based on the location of the receiver relative to the wireless communication system 10. Accordingly, direction of transmission of the output signal depends on the position and possibly orientation of the wireless communication system 10. The communication satellite 16 transmits the position information of the wireless communication system 10 to the wireless positioning system 12. The position information is received by the wireless positioning system 12 as incoming signals which are processed therein to generate coordinate information indicating the position of the wireless communication system 10. The coordinate information is transferred to the wireless transmission system 14 through which the coordinate information is exchanged between the wireless communication 10 and the receiver. Accordingly, the coordinate information allows the wireless transmission system 14 to identify the direction to be used in beamforming. That is the output signal is transmitted by the wireless transmission system 14 in the direction of the receiver using beamforming.

In beamforming the phase of the transmitted signals is adjusted to focus the energy in a specified direction. The specified direction points from the wireless communication system 10 to the receiver. The wireless communication system 10 uses the coordinate information and the position of the receiver to specify the direction of beamforming.

In one embodiment of the present invention the receiver is a base station for receiving and transmitting RF signals. Specifically, the base station transmits and receives signals to and from the wireless communication system 10. The base station may also perform beamforming to communicate with the wireless communication system 10. Beamforming performed by both the base station and the wireless communication system 10 improves communication therebetween by increasing the bandwidth and extending the transmission range, as described in detail hereinbelow. Higher bandwidth results in increased throughput which combined with a long transmission range offers substantial improvement over the conventional communication systems.

In one embodiment of the present invention the wireless positioning system 12 is a global positioning system (GPS) although other types of satellite-assisted positioning systems may be used in other embodiments of the present invention.

In one embodiment of the present invention the wireless communication system 10 is a mobile system located in a vehicle in which case the wireless communication system 10 is referred to as an access point. The wireless communication system 10 communicates with one or more base stations as the vehicle moves about. The position of the vehicle in real-time is determined by the wireless positioning system 12 to allow beamforming to be performed by both the access point and the base station. Such a mobile access point allows for broadband communication over a substantially long range.

Figure 2:
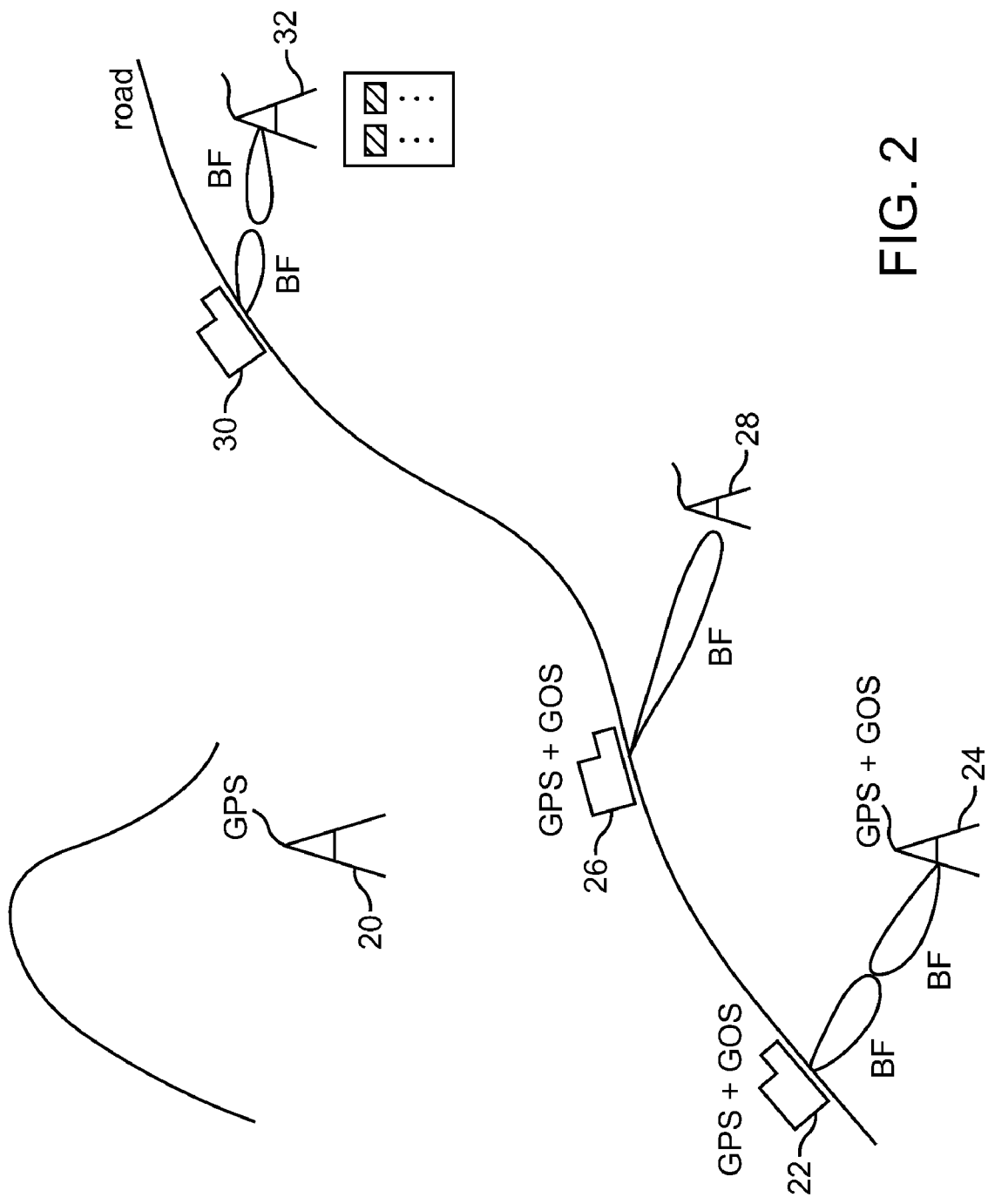
FIG. 2 shows three vehicles in communication with three base stations, in accordance with an embodiment of the present invention.

Referring now to FIG. 2, three vehicles 22, 26, and 30 are shown to be communicating with three base stations 24, 28, and 32, respectively. In addition an antenna 20 transmits position information to the vehicles 22, 26 and 30. The position information may originate from a communication satellite (not shown in FIG. 2) and transmitted therefrom to the antenna 20 or directly to the wireless communication systems installed in the three vehicles 22, 26 and 30. The wireless communication system 10 is installed in the three vehicles 22, 26 and 30 to allow communication with the base stations 24, 28 and 32, respectively. The mobile wireless communication system installed in the vehicles is referred to as the access point.

In the conventional mobile wireless communication systems beamforming is performed by the base station. As the number of vehicles communicating with the base stations increases a longer data base is needed in the base station. Accordingly, the cost of base station in the conventional mobile wireless communication systems becomes substantial as the number of vehicles being tracked increases. In recent times WIMAX has increased the range and bandwidth for communicating with the access point to some degree. However, for long range high throughput communication there needs to be considerable improvement as described hereinbelow.

The improvement offered by the WIMAX is approximately 10 decibels (dB) in transmission power enabling the signals to be transmitted over a longer range. The range covered by WIMAX is approximately 10 miles with a throughput of approximately 1 Mbits/sec. However, for current mobile wireless communication systems it is estimated that an improvement of approximately 30 dB is required for long range, broadband communication. To achieve the extra 20 dB of transmission power beamforming is performed by the access point and the base station. The antennas of the access point in the vehicle are directed to perform beamforming in the direction of the base station.

In contrast in the conventional cellular phones the base station performs beamforming to communicate with each of the access points resulting in a substantially large data base to track the numerous vehicles on the road. This is sufficient for cellular phone and other voice related communication systems since the bandwidth required is relatively narrow and the range is relatively long.

Alternatively in a wireless local area network (LAN) the bandwidth is substantially wide but the range is relatively short. Since wireless LAN is often used indoor, such as in an office environment the relatively short range is acceptable.

However, for broadband long range communication beamforming is performed by both the access point in vehicle 22 and the base station 24. Accordingly, the gap between the access point and the base station diminishes and the role of the access point and the base station becomes more balanced. Thus, instead of requiring an expensive base station for communication, the cost is shared between the base station and the access point resulting in reduction of the overall cost.

In the embodiment of the present invention shown in FIG. 2 the client, i.e. vehicle 22, 26 or 30 takes on more function than conventional wireless communication systems by performing beamforming. Beamforming is performed in both directions by the client 22 and 30 and the base stations 24 and 32, respectively. For example, the access point in vehicle 22 communicates with the base station 24 and people in vehicle 22 communicate with the access point therein instead of the base station 24. As a result, a more powerful wireless communication system may be devised as the access point.

As the cost of wireless communication system 10 decreases it will be cost effective for the client to employ a plurality of antennas for transmission of signals. In such cases, the IEEE 802.11n standard is followed as specified for multi-input multi-output (MIMO) communication systems.

In addition to knowing the position of the vehicle as specified by the coordinate information, the orientation of the vehicle relative to the base station is also needed for determining the direction for beamforming. To determine the orientation of the vehicle a system such as global orientation system (GOS) is used which functions essentially as an electronic compass. The GOS uses earth's magnetic field to determine the orientation. The GOS is integrated in the wireless communication system 10. Thus, position and angle of orientation are used to direct the antenna to focus the transmission power in the direction of communication with the base station.

As the price of GOS and wireless positioning system 12 decreases the wireless communication system 10 becomes more readily available and may be installed in vehicles at an affordable cost. In FIG. 2, wireless communication system 10 is installed in the vehicles 22, 26 and 30.

Alternatively, FIG. 2 may be seen as indicating a single vehicle at three different positions at three different times. Namely, the vehicle is initially at position 22 communicating with the base station 24, at a later time the same vehicle is at position 26 communicating with the base station 28 and finally the same vehicle is at position 30 communicating with base station 32.

To track a client intelligently beamforming is allowed to follow the client on the road which requires knowledge of the position of the client and the base station. Based on the orientation of the client transmitter antennas on the client side are adjusted to perform beamforming in the direction of the base station. The client in FIG. 2 is any of the vehicles 22, 26 or 30.

Initially as the vehicle starts on the road there is no information on the position of the base station so no beamforming may be performed. As a result the range of transmission is shorter. However, before connecting to base station there are several ways of determining the position of the base station. In some cases the service provider maintains a map wherein the position of the base station is shown. In another case the vehicle may reach the vicinity of a base station and start communicating therewith. The position of the neighboring base stations may then be provided by the service provider. Once the position of the service provider is determined beamforming may be performed to direct the energy in the direction of the base station rather than omni-directional transmission used in the conventional wireless transmission systems. The base station may also employ beamforming as in the case of base stations 24 and 32 shown in FIG. 2. Beamforming in both directions allows for broadband long-range communication between the client and base station.

The position information of the client is transmitted by a communication satellite (not shown in FIG. 2) which is received as incoming signals. The position information is processed by the wireless communication system 10 installed in the vehicles 22, 26 and 30 to generate coordinate information which is used to identify the direction of beamforming.

Figure 3:
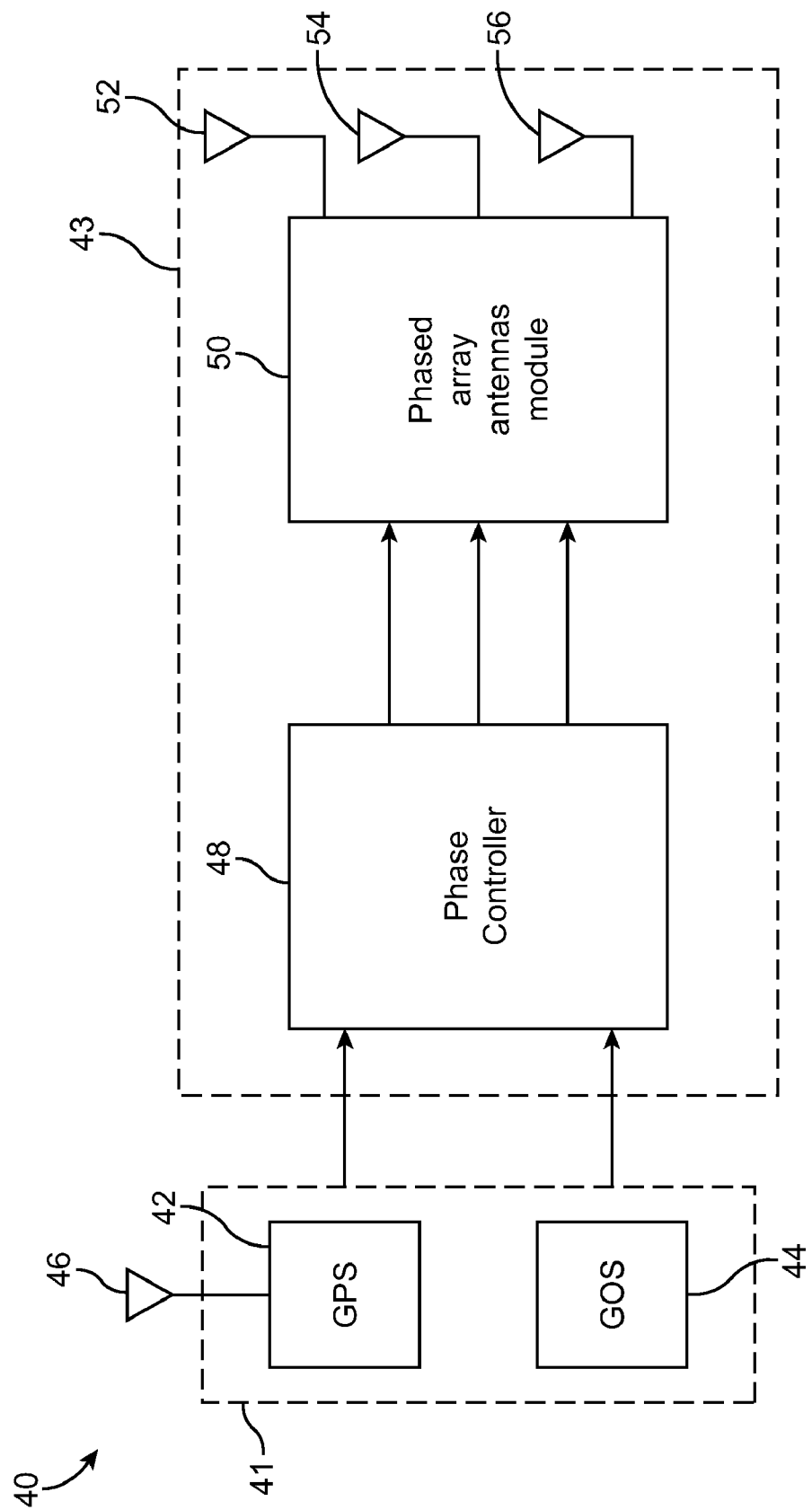
FIG. 3 shows the internal architecture of a wireless communication system, in accordance with an embodiment of the present invention.

Referring now to FIG. 3, a wireless communication system 40 is shown to include a wireless positioning system 41 and a wireless transmission system 43 and a plurality of antennas 52-56, in accordance with an embodiment of the present invention. The wireless positioning system 41 includes a global positioning system (GPS) module 42 and a GOS module 44. The wireless transmission system 43 includes a phase controller 48 and a phased array antennas module 50.

The GPS module 42 and the GOS module 44 are coupled to the phase controller 48 which is coupled to the phased array antennas 50 which is coupled to the antennas 52-56. Additionally, an antenna 46 is coupled to the GPS module 42. The wireless communication system 40 may be located in a vehicle communicating with one or more base stations while moving along a road or remaining with one or more base stations while moving along a road or remaining stationary, as shown in FIG. 2.

Antenna 46 receives incoming signals from a communication satellite (not shown in FIG. 3) which are processed by the GPS module 42 to generate coordinate information. In addition, the GOS module 44 determines the orientation of the vehicle wherein wireless communication satellite 40 is located by measuring the direction of the earth's magnetic field. Thus the GOS module 44 does not require an antenna to determine the orientation of the vehicle. The information regarding orientation of the vehicle is transferred from the GOS module 44 to the phase controller 48. The coordinate information is also transferred from the GPS module 42 to the phase controller 48.

The phase controller 48 controls beamforming by controlling the amplitude and phase of the of the output signals at each transmitting antenna to create a pattern of constructive and destructive interference therein. Generally, phase controller 48 works as an optimizer which converges to a beamforming solution when the constraints are set properly. Adaptive arrays have been used to find such solutions as described in more detail in the publication "Adaptive Antenna Systems" by Widrow, B. Mantey, P. E., Griffiths, L. J. and Goode, B. B., Proceedings of the IEEE, Vol. 55, No. 12, December 1967.

Information regarding the amplitude and phase of the output signals is transferred to the phase arrayed antennas module 50 which is coupled to a plurality of antennas 52-56. The phased arrayed antennas module 50 varies the relative phases of the output signals being fed to the antennas 52-56 such that the effective radiation pattern of the output signal is reinforced in a specific direction.

In the conventional phased array antennas assembly, the antennas are fixed and only the phase and possibly amplitudes are adjusted for beamforming. However, in the embodiment of the present invention shown in FIG. 3 the antennas may be directed to focus the transmission power in the direction of communication.

One embodiment of the phased array antennas module 50 may include 16 phased array antennas. Beamforming by the wireless communication system 40 provides 12 dB of transmission power while beamforming by the base station provides additional 12 dB. Also 10 dB of transmission power is available for outdoor communication through such systems as WIMAX. Thus, more than 30 dB of transmission power is provided by the wireless communication system 40 allowing for long-range broadband communication between the client and the base station.

Although the present invention has been described in terms of specific embodiment, it is anticipated that alterations and modifications thereof will no doubt become apparent to those more skilled in the art. It is therefore intended that the following claims be interpreted as covering all such alterations and modification as fall within the true spirit and scope of the invention.

What is claimed is:

1. A wireless communication system used in an access point that is in communication with a receiver, the wireless communication system for transmitting signals to the receiver and comprising:

a wireless positioning system, mobile with the wireless communication system and in communication with at least one receiver as it is moving, and being responsive to an incoming signal for processing the same to generate coordinate information, said wireless positioning system configured to identify a direction of beamforming using the position and orientation of the receiver, by adjusting the phase of the incoming signal to focus the energy thereof in the direction of the receiver, said wireless positioning system further configured to determine the position of said wireless communication system in real-time; and a phase controller being responsive to said coordinate information and to orientation of the receiver, the phase controller operative to exchange said coordinate information with the receiver for allowing the wireless communication system to identify the direction to be used for beamforming, the phase controller for controlling the phase and amplitude of output signals at each transmitting antenna to create a pattern of constructive and destructive interference therein for transmission to the receiver in a specified direction by performing beamforming, said wireless communication system for performing beamforming to increase the range of transmission of said output signals;

a global orientation system (GOS) configured to measure the direction of earth's magnetic field to determine the orientation of the receiver, allowing use of the position and angle of orientation of the receiver to direct the antenna of the receiver to focus the transmission power thereof in the direction of communication with the access point, wherein based on the orientation of the receiver transmitter antennas of the receiver, the receiver transmitter antennas are adjusted to perform beamforming in the direction of the access point, the orientation of the receiver being provided to the phase controller for identifying the direction to be used for beamforming.

2. A wireless communication system as recited in claim 1 for performing beamforming to allow long range broadband communication between said wireless communication system and the receiver.

3. A wireless communication system as recited in claim 2 being a mobile system positioned in a vehicle, said wireless communication system being an access point communicating with one or more base stations, said base station for including said receiver to establish long-range broadband communication therebetween.

4. A wireless communication system as recited in claim 3 wherein beamforming being performed by said access point and said base station to increase transmission power, said access point and said base station for performing beamforming to allow broadband long-range communication therebetween.

5. A wireless communication system as recited in claim 4 wherein WIMAX communication system being used for increasing the range and bandwidth of outdoor communication, said access point and said base station for performing beamforming and said WIMAX communication system for performing outdoor communication to allow long-range broadband communication.

6. A wireless communication system as recited in claim 4 wherein said access point and said base station for performing beamforming to share the cost of communication therebetween to result in reduction of the overall cost of manufacturing and operating said base station.

7. A wireless communication system as recited in claim 3 wherein said access point for employing a plurality of antennas to transmit said output signals, said wireless communication system for employing the standard specified for multi-input multi-output (MIMO) systems for transmitting said output signals, said plurality of antennas being directed in the direction of communication with said base station.

8. A wireless communication system as recited in claim 7 wherein said phase controller for controlling the amplitude and phase of said output signals at said plurality of antennas to generate a pattern of constructive and destructive interference to be used in beamforming.

9. A wireless communication system as recited in claim 8 further including a phased array antennas module for changing the relative phases of said output signals for transmission by said plurality of antennas, said phased array antennas module for reinforcing the radiation pattern of said output signals in a specifies direction.

10. A wireless communication system as recited inn claim 1 wherein said wireless positioning system for communicating with a communication satellite to generate said coordinate information, said coordinate information for specifying the direction of transmission in beamforming.

11. A wireless communication system as recited in claim 10 wherein said wireless positioning system for using global positioning (GPS) to generate said coordinate information.

12. A wireless communication system as recited in claim 1 wherein said wireless transmission system for including a global orientation system (GOS) module for determining orientation information of said wireless communication system by measuring the direction of the earth's magnetic field, said orientation information being transferred to said phase controller to specify the direction of transmission in beamforming.

* * * * *